(12) United States Patent
Trepke

(10) Patent No.: US 12,179,302 B2
(45) Date of Patent: Dec. 31, 2024

(54) PACKAGING MACHINE AND METHOD FOR ADJUSTING MULTIPLE MACHINE ELEMENTS ON A PACKAGING MACHINE

(71) Applicant: ROVEMA GMBH, Fernwald (DE)

(72) Inventor: Peter Trepke, Romrod (DE)

(73) Assignee: ROVEMA GMBH, Fernwald (DE)

(*) Notice: Subject to any disclaimer, the term of this patent is extended or adjusted under 35 U.S.C. 154(b) by 158 days.

(21) Appl. No.: 17/791,370

(22) PCT Filed: Dec. 16, 2020

(86) PCT No.: PCT/EP2020/086505
§ 371 (c)(1),
(2) Date: Jul. 7, 2022

(87) PCT Pub. No.: WO2021/139987
PCT Pub. Date: Jul. 15, 2021

(65) Prior Publication Data
US 2023/0030045 A1 Feb. 2, 2023

(30) Foreign Application Priority Data
Jan. 8, 2020 (DE) .................. 10 2020 100 208.4

(51) Int. Cl.
*B23Q 15/22* (2006.01)
*B65B 57/10* (2006.01)
*B65B 59/00* (2006.01)

(52) U.S. Cl.
CPC ............. *B23Q 15/22* (2013.01); *B65B 57/10* (2013.01); *B65B 59/001* (2019.05)

(58) Field of Classification Search
CPC ........ B65B 57/10; B65B 59/001; B23Q 15/22
See application file for complete search history.

(56) References Cited

U.S. PATENT DOCUMENTS

| | | | | |
|---|---|---|---|---|
| 2,260,332 A | * | 10/1941 | Petskeyes | B65B 25/16 53/507 |
| 3,741,080 A | * | 6/1973 | Kuhnle | B65B 9/093 83/240 |
| 3,911,769 A | * | 10/1975 | Lecrone | B26D 3/08 83/873 |
| 3,922,958 A | * | 12/1975 | Bate | B65B 9/02 493/203 |
| 4,323,098 A | * | 4/1982 | Suzuki | B23Q 23/00 493/34 |

(Continued)

FOREIGN PATENT DOCUMENTS

| | | | |
|---|---|---|---|
| EP | 1923805 A1 | 5/2008 | |
| WO | WO-2008061580 A1 * | 5/2008 | ............... G01D 5/20 |

OTHER PUBLICATIONS

PCT International Search Report and Written Opinion, PCT/EP2020/086505, Apr. 7, 2021, 17 pages.

*Primary Examiner* — Thomas M Wittenschlaeger
*Assistant Examiner* — David G Shutty
(74) *Attorney, Agent, or Firm* — Quarles & Brady LLP

(57) ABSTRACT

A packing machine and a method for adjusting multiple machine elements on a packaging machine. The position of each machine element is changeable by driving an assigned spindle in a rotary manner. A position measuring device is present on each spindle to measure the position of the assigned spindle. The measurement data of the different position measuring devices are transmittable to a control.

9 Claims, 2 Drawing Sheets

(56) References Cited

U.S. PATENT DOCUMENTS

Figure 1:
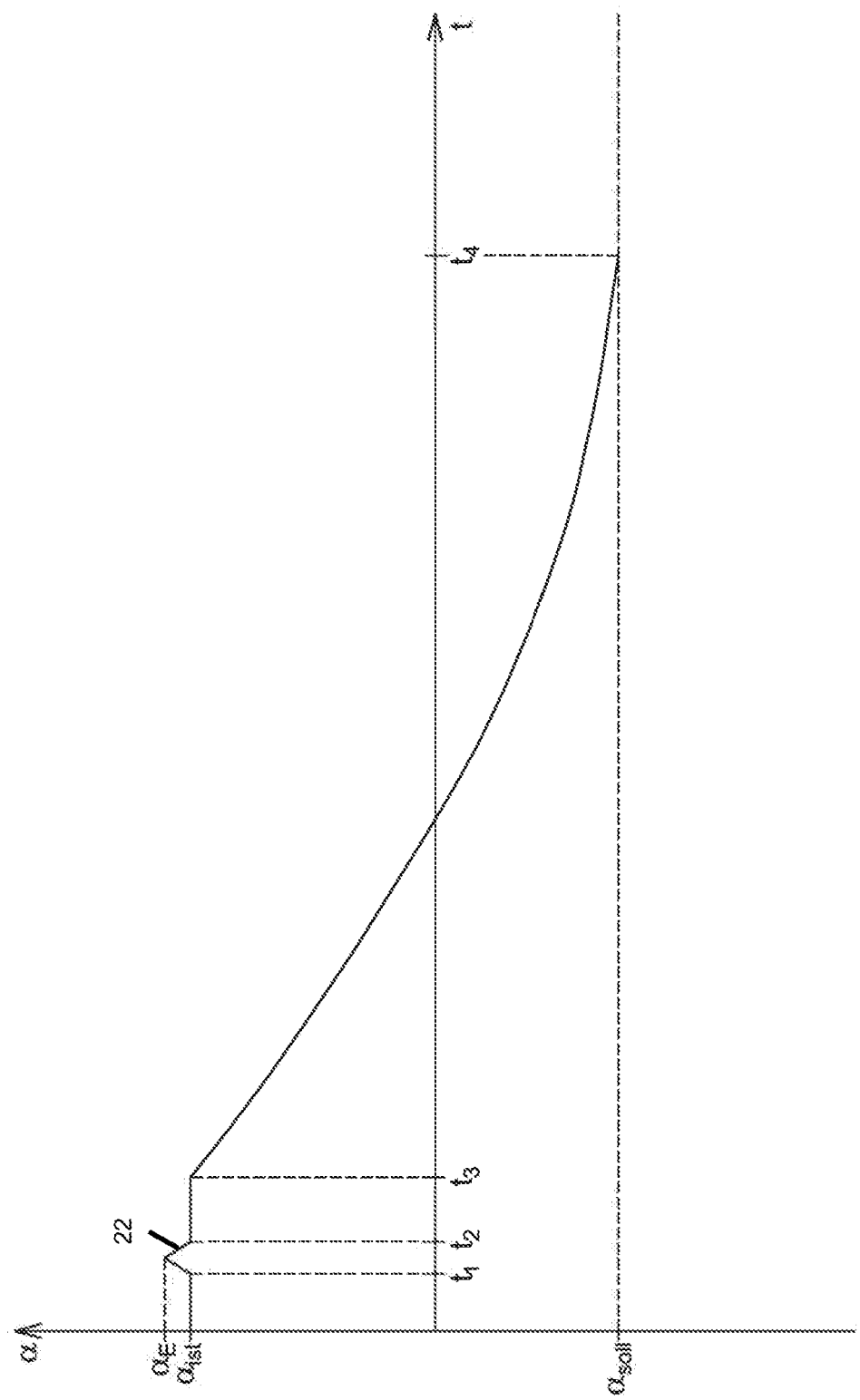

| | | | | |
|---|---|---|---|---|
| 4,565,048 A * | 1/1986 | Lade | ............ | B65B 59/001 |
| | | | | 493/476 |
| 5,056,235 A * | 10/1991 | Thomas | ............ | G08C 23/04 |
| | | | | 340/870.11 |
| 5,574,350 A * | 11/1996 | Duss | ............ | G05B 19/351 |
| | | | | 318/632 |
| 5,778,550 A * | 7/1998 | Carli | ............ | G01B 21/04 |
| | | | | 33/503 |
| 5,817,951 A * | 10/1998 | Cook | ............ | G01L 5/1627 |
| | | | | 73/862.041 |
| 6,827,678 B1 * | 12/2004 | Kumpel | ............ | B31B 50/006 |
| | | | | 493/51 |
| 8,905,226 B2 * | 12/2014 | Langanki | ............ | B65G 21/2072 |
| | | | | 198/803.11 |
| 11,498,789 B2 * | 11/2022 | Reinsch | ............ | B41F 21/00 |
| 2015/0210415 A1 * | 7/2015 | Bruns | ............ | B65B 51/20 |
| | | | | 414/816 |
| 2017/0274612 A1 * | 9/2017 | Nadachi | ............ | B05C 5/025 |
| 2022/0355505 A1 * | 11/2022 | Clössner | ............ | B65B 61/08 |
| 2023/0030045 A1 * | 2/2023 | Trepke | ............ | B23Q 15/22 |

* cited by examiner

PACKAGING MACHINE AND METHOD FOR ADJUSTING MULTIPLE MACHINE ELEMENTS ON A PACKAGING MACHINE

This application represents the national stage entry of PCT International Patent Application No. PCT/EP2020/086505 filed on Dec. 16, 2020 and claims priority to German Patent Application No. 10 2020 100 208.4 filed Jan. 8, 2020. The contents of each of these applications are hereby incorporated by reference as if set forth in their entirety herein.

The disclosure relates to a method for adjusting multiple machine elements on a packaging machine according to the preamble of claim 1. Furthermore, the disclosure relates to a packaging machine for performing the method according to the disclosure.

In packaging machine technology, often spindles are used to adjust the position of particular machine elements in the packaging machine. In this case, the term "spindle" is to be understood in a broad sense and is to comprise in particular also corresponding shafts which are drivable in order to adjust machine elements. In order to be able to indirectly determine the respective actual position of the machine element, a position measuring device, for example an incremental angle of rotation sensor, by means of which the position of the spindle can be measured is assigned to the spindles. In this case, the actual position which is measured by means of the position measuring device can be transmitted to the control of the packaging machine at a corresponding data interface.

In the case of format adjustments of a packaging machine in order to adjust the packaging machine to another packaging size, a plurality of machine elements has to be repositioned and the adjusting spindles provided for this purpose have to be driven accordingly. The degree of automation for driving the spindles in order to adjust the machine elements is subject to a cost-benefit ratio. If the corresponding spindles are adjusted only rarely or occasionally, the installation of a remotely controllable drive for driving the spindles in a rotary manner is usually not profitable. In such cases, for cost reasons, the spindles may often be adjusted manually and an adjusting drive for the individual spindles is dispensed with.

From EP 1 923 805 A1 a packaging machine is known in which, in order to solve the problem described above, an adjusting device is provided which is not assigned to a single spindle. Instead, the adjusting device, which can, for example, be a cordless screwdriver, is provided with a wireless data transmission interface. Due to this data interface, the adjusting device can, after coupling to a particular spindle, exchange data with the position measuring device assigned to the spindle. That is, as soon as the adjusting device is coupled to a particular spindle, a data exchange is automatically established between the adjusting device and the position measuring device assigned to the spindle. In this case, the necessary data for controlling the adjusting device when adjusting the spindle can be transmitted via this data channel.

The disadvantageous of this procedure when adjusting the packaging machine is that an adjusting device having a corresponding data interface for establishing the data channel with the position measuring device has to be present. In particular, no standard tool for adjusting the spindle, for example a standardized cordless screwdriver, can be used.

The object of the present disclosure is therefore to propose a method for adjusting multiple machine elements on a packaging machine, wherein the method can be operated by means of a simple adjusting device.

Furthermore, the object of the present disclosure is to propose a packaging machine for performing the method according to the disclosure. The method according to the disclosure is characterized in that, after coupling the adjusting device to the spindle which is to be adjusted in each case, at first, a so-called recognition travel is carried out. In this recognition travel, the adjusting device is driven with a predefined detection adjusting movement. In the first instance, this detection adjusting movement has not yet anything to do with the actually planned adjustment of the spindle. Rather, the spindle is adjusted along a short detection adjustment path by means of the predefined detection adjusting movement in order to measure this adjustment by means of the assigned position measuring device and to detect this adjustment in the control by evaluating the data correspondingly. This means in other words that, by means of the detection adjusting movement, at first, the spindle, to which the adjusting device is coupled, is recognized via the control.

Subsequently, the deviation between the measured actual value and the predetermined target value of the position is detected for the detected spindle via the control and, subsequently, an adjustment signal for controlling the adjusting device is generated. This adjustment signal is formed exactly in such a manner that the spindle is adjusted from the actual position into the desired target position by correspondingly driving the adjusting device.

Since the respective spindle to which the adjusting device is currently coupled is recognized by measuring the detection adjustment path by means of the position measuring device, a recognition by establishing a bidirectional data channel between the adjusting device and the control can be dispensed with. Instead, it is sufficient when the control transmits the adjustment signal to the adjusting device via a corresponding simple data channel after having detected the spindle to which the adjusting device is coupled. If, for example, a cordless screwdriver is used as an adjusting device, a corresponding output signal for controlling the drive power of the cordless screwdriver is sufficient for the transmission of the adjustment signal. It is generally optional which kind of predefined detection adjusting movement is used for the recognition of the spindle to which the adjusting device is coupled. It only is a prerequisite that the predefined detection adjusting movement realizes a detection adjustment path which can be measured without any problems by means of the position measuring device and detected without any problems by means of the control. According to a preferred method variant, when driving the adjusting device with the predefined detection adjusting movement, the spindle may be adjusted by a predefined angular amount in a direction of rotation in a first step and by the same angular amount in the direction of counterrotation in a second step. This means in other words that after having trailed the detection adjustment path, the spindle driven by means of the adjusting device is positioned at the same adjustment angle as before trailing the detection adjustment path. Due to the two-step embodiment of the detection adjustment path, said detection adjustment path can be clearly recognized in the control and the corresponding spindle can be detected without any problems.

In order to be able to adjust the spindle largely automatically and within a short time, it is, furthermore, particularly advantageous if the adjustment signal for controlling the adjusting device when adjusting the detected spindle from the actual position into the target position is automatically output by the control in a time-controlled manner after a preset time period after the trailing of the detection adjustment path has been completed. This means in other words that, at first, the adjusting device is driven with the predefined detection adjusting movement. As soon as, in this way, the detection adjustment path has been travelled through by the spindle and measured by means of the position measuring device, thereby, the information about the spindle to which the adjusting device is coupled is available in the control by the evaluation of the measured values of the position measuring device. Then, within a preset time period, the adjustment signal for controlling the adjusting device for the adjustment of the spindle from the actual position into the desired target position is generated and automatically output in a time-controlled manner. That is, after the trailing of the detection adjustment path has been completed, the necessary adjusting movement for adjusting the spindle is performed automatically after a particular time period, without requiring any intervention by the operating personnel.

When adjusting the format of a packaging machine for the adjustment to a new packaging size, a plurality of machine elements and the corresponding spindles have to be readjusted. In order to be able to easily adjust the format on the packaging machine, method steps a) to e) may be performed for all spindles of the packaging machine. Operator-controlled adjustments of the spindle can thus be dispensed with.

If all spindles of the packaging machine which are to be adjusted in a format adjustment are adjusted using the method according to the disclosure, it is particularly advantageous if the adjustment of these spindles is monitored. Only if the monitoring of all of these spindles shows that all spindles are adjusted in the required manner, the operation of the packaging machine is enabled again. In this way, it is precluded that the operation of the packaging machine is started although not all spindles have been adjusted in the manner required for the format adjustment.

For performing the method according to the disclosure, it is necessary that, at first, a detection adjusting movement is travelled through with the adjusting device coupled to each spindle to be adjusted in order to adjust the spindle along the predetermined detection adjustment path during a recognition travel. It is generally optional in which way the trailing of this recognition travel is triggered by operating personnel. A particularly simple and intuitive use of the system is achieved by providing a trigger element on the adjusting device, wherein the trailing of the recognition path, that is the driving of the adjusting device with the predefined detection adjusting movement, can be triggered by actuating said trigger element. As soon as the operating personnel has coupled the adjusting device to a spindle, the detection process can be triggered by actuating the trigger element and, as a result, the spindle to which the adjusting device is coupled can be detected via the control. If necessary, after the detection of the corresponding spindle, the adjustment signal for controlling the adjusting device when adjusting the detected spindle from the actual position into the target position can then be output automatically, for example by time control, such that, as a result, after the coupling of the adjusting device to the spindle, the operating personnel only has to actuate the trigger element on the adjusting device. All other process steps for adjusting the spindle are detected and/or generated automatically via the control.

The trigger element on the adjusting device can particularly easily be realized in the manner of a pressure switch. The data required for the transmission of the adjustment signal for controlling the adjusting device when adjusting the detected spindle from the actual position into the target position can be transmitted to the adjusting device by the control either via a wired data interface or via a wireless data interface.

A method variant of the method according to the disclosure is illustrated in the drawing in a schematized manner and will be explained as an example below.

FIG. 1 shows the adjusting movement of a spindle on a packaging machine after the coupling of an adjusting device when the method according to the disclosure is performed.

Figure 2:
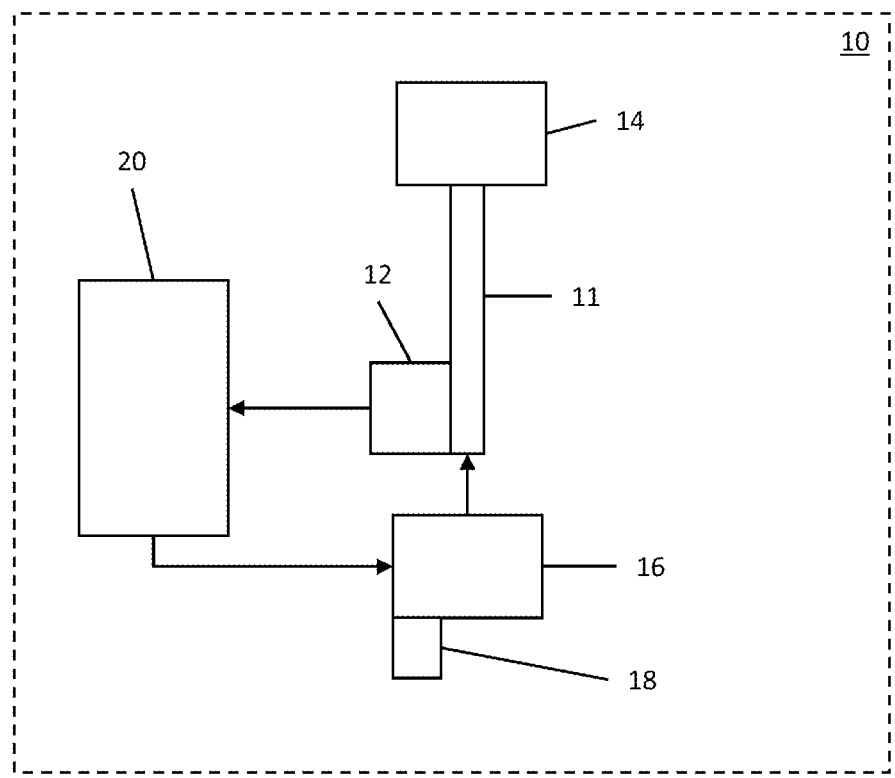

FIG. 2 shows a block diagram of a packaging machine including a spindle driving a machine element, position measuring device measuring the position of the spindle, adjusting device adjusting the position of the spindle, a trigger for triggering the adjustment device, and control, in accordance with the disclosure. Although a single spindle and machine element are illustrated here for clarity, the packaging machine may include a plurality of spindles.

FIG. 1 shows the adjusting movement, namely the angle of rotation $\alpha$, of a spindle 11 driven to adjust machine elements 14 on a packaging machine 10 when the method according to the disclosure is performed. When coupling the adjusting device 16, for example a cordless screwdriver coupled to the control 20 by means of a cable, when the spindle 11 is in the position $\alpha_{ist}$ at point in time $t_1$, a recognition travel is triggered by pressing a trigger 18, the pressure switch on the cordless screwdriver. In this recognition travel, the spindle 11 is driven by driving the cordless screwdriver with a predefined detection adjusting movement such that the spindle 11 passes through a detection adjustment path 22. In the example illustrated in FIG. 1, the spindle 11 passes through a detection adjustment path 22 in which the spindle 11 is adjusted from angle $\alpha_{ist}$ to angle $\alpha_E$ in a first step and, subsequently, from angle $\alpha_E$ to the initial position $\alpha_{ist}$ in an opposite direction. The adjustment of the spindle 11 during the recognition travel is performed in the time period $t_1$ to $t_2$. This detection adjusting movement can be measured by means of a position measuring device 12 on the corresponding spindle 11 and detected by the control 20 of the packaging machine 10 connected to the position measuring device 12. In this way, a detection of the spindle 11 to which the adjusting device 16 is coupled when travelling through the recognition travel in the time period $t_1$ to $t_2$ is possible via the control 20. In the subsequent time period $t_2$ to $t_3$ an adjustment signal is calculated in the control 20 in order to adjust the corresponding spindle 11 from the actual position $\alpha_{ist}$ into the target position $\alpha_{soll}$. This adjusting signal is then output automatically and in a time-controlled manner after a preset time period such that the spindle 11 is adjusted in a time-controlled manner at point in time $t_3$ by correspondingly driving the adjusting device 16. At point in time $t_4$, the spindle 11 reaches then the desired target position $\alpha_{soll}$ and the adjusting device 16 is automatically switched off.

The invention claimed is:

1. A method for adjusting multiple machine elements on a packaging machine, wherein the position of each machine element is changeable by driving an assigned spindle in a rotary manner, and wherein a position measuring device by means of which the position of the assigned spindle is measurable is present on each spindle, and wherein the measurement data of the different position measuring devices are transmittable to a control, the method comprising the following method steps:

a) coupling an adjusting device to a spindle, wherein the spindle is drivable in a rotary manner by driving the adjusting device;
b) driving the adjusting device with a predefined detection adjusting movement, wherein the spindle is adjusted along a detection adjustment path by means of the predefined detection adjusting movement;
c) detecting the spindle, for which the adjustment along the detection adjustment path has been transmitted, via the control;
d) determining the deviation between the measured actual value ($\alpha_{ist}$) and a predetermined target value ($\alpha_{soll}$) of the position of the spindle via the control;
e) via the control, generating an adjustment signal for controlling the adjusting device when adjusting the spindle from the actual position ($\alpha_{ist}$) into the target position ($\alpha_{soll}$).

2. The method according to claim 1, wherein when driving the adjusting device with the predefined detection adjusting movement, the spindle is adjusted by a predefined angular amount in a direction of rotation in a first step and by the same angular amount in the direction of counterrotation in a second step.

3. The method according to claim 1, wherein the adjustment signal for controlling the adjusting device when adjusting the detected spindle from the actual position into the target position is automatically output by the control in a time-controlled manner after a preset time period ($t_2$ to $t_3$).

4. The method according to claim 1, wherein method steps a) to e) are performed for all spindles of the packaging machine which have to be adjusted in a format adjustment of a packaging to be processed.

5. The method according to claim 4, wherein the adjustment of all spindles which are to be adjusted in the format adjustment of the packaging to be processed is monitored, wherein an operation of the packaging machine is blocked until all spindles which are to be adjusted in the format adjustment of the packaging to be processed are adjusted.

6. A packaging machine for performing a method according to claim 1, wherein the position of each machine element is changeable by driving an assigned spindle in a rotary manner, and wherein a position measuring device by means of which the position of the assigned spindle is measurable is present on each spindle, and wherein the measurement data of the different position measuring devices are transmittable to a control,
the packaging machine comprising:
an adjusting device coupled to a spindle of the packaging machine; and
a trigger element provided on the adjusting device; wherein the coupled spindle is driven in a rotary manner by driving the adjusting device and wherein, by actuating the trigger element, driving the adjusting device with a predefined detection adjusting movement is triggered, and wherein the spindle is adjusted along a detection adjustment path by means of the predefined detection adjusting movement.

7. The packaging machine according to claim 6, wherein the trigger element is a pressure switch.

8. The packaging machine according to claim 6, wherein the adjusting device and the control exchange data via a wired data interface.

9. The packaging machine according to claim 6, wherein the adjusting device and the control exchange data via a wireless data interface.

* * * * *